United States Patent [19]
Chen

[11] Patent Number: 5,689,716
[45] Date of Patent: Nov. 18, 1997

[54] AUTOMATIC METHOD OF GENERATING THEMATIC SUMMARIES

[75] Inventor: Francine R. Chen, Menlo Park, Calif.

[73] Assignee: Xerox Corporation, Stamford, Conn.

[21] Appl. No.: 422,573

[22] Filed: Apr. 14, 1995

[51] Int. Cl.⁶ .................................................. G06F 15/00
[52] U.S. Cl. ................................................................ 395/761
[58] Field of Search ........................ 364/419.19, 419.09;
395/155, 161, 761

[56] References Cited

U.S. PATENT DOCUMENTS

| | | | |
|---|---|---|---|
| 4,965,763 | 10/1990 | Zamora | 364/900 |
| 5,077,668 | 12/1991 | Doi | 364/419 |
| 5,257,186 | 10/1993 | Ukita et al. | 364/419.1 |
| 5,495,349 | 2/1996 | Ikeda | 358/518 |

FOREIGN PATENT DOCUMENTS 0 544 432 A2  6/1993  European Pat. Off. .

OTHER PUBLICATIONS

Cheong, T.L., Lip, T.S., "A Statistical Approach to Automatic Text Extraction", Institute of Systems Science; Asian Library Journal, pp. 1–8.

"The Identification of Important Concepts in Highly Structured Technical Papers" by Paice, et al., ACM–SIGIR '93–Jun. 1993 Pittsburgh, PA, pp. 69–78.

Jones, R.L. "AIDA the Artificially Intelligent Document Analyzer", McDonald, C., Weckert, J. ed., Libraries and Expert Systems. Proceedings of a Conference and Workshop, pp. 49–57; 22–24 Jul. 1990; Riverina, NSW, Australia. London, UK: Taylor Graham; 1991.

Jones, R.L., Corbett, D. "Automatic Document Content Analysis: The AIDA Project", Library Hi Tech, vol. 10, No. 1–2, pp. 111–117.

Luhn, H.P. "The Automatic Creation of Literature Abstracts", IBM Journal of Research and Development, vol.2 (2); pp. 159–162; 1958.

Luhn, H.P. "A Business Intelligence System", IBM Journal of Research and Development, vol. 2 (2); pp. 314–319, 1958.

Primary Examiner—Phu K. Nguyen
Attorney, Agent, or Firm—Tracy L. Hurt

[57] ABSTRACT

A technique for automatically generating thematic summaries for machine readable representations of documents. The technique begins with determining the number of thematic terms to be used based upon the number of thematic sentence to be extracted. To insure some commonality of theme between extracted sentences, the number of thematic terms used should be less than the number of thematic sentences to be extracted. Having determined the appropriate number of thematic terms, next the method identifies the thematic terms within the document. Afterward, each sentence of the document is scored based upon the number of thematic terms contained within the sentence. The desired number of highest scoring sentences are selected as thematic sentences.

10 Claims, 2 Drawing Sheets

1

AUTOMATIC METHOD OF GENERATING THEMATIC SUMMARIES

FIELD OF THE INVENTION

The present invention relates to a method of automatic text processing. In particular, the present invention relates to an automatic method of generating thematic summaries of documents.

BACKGROUND OF THE INVENTION

Document summaries and abstracts serve a valuable function by reducing the time required to review documents. Summaries and abstracts can be generated after document creation either manually or automatically. Manual summaries and abstracts can be of high quality but may be expensive because of the human labor required. Alternately, summaries and abstracts can be generated automatically. Automatic summaries and abstracts can be cheaper to produce, but obtaining high quality consistently is difficult.

Systems for generating automatic summaries rely upon one of two computational techniques, natural language processing or quantitative content analysis. Natural language processing is computationally intensive. Additionally, producing semantically correct summaries and abstracts is difficult using natural language processing when document content is not limited.

Quantitative content analysis relies upon statistical properties of text to produce summaries. Gerald Salton discusses the use of quantitative content analysis to summarize documents in "Automatic Text Processing" (1989). The Salton summarizer first isolates text words within a corpus of documents. Next, the Salton summarizer flags as title words words used in titles, figures, captions, and footnotes. Afterward, the frequency of occurrence of the remaining text words within the document corpus is determined. The frequency of occurrence and the location of text words are then used to generate word weights. The Salton summarizer uses the word weights to score each sentence of each document in the document corpus. These sentence scores are used in turn to produce a summary of a predetermined length for each document in the document corpus. Summaries produced by the Salton summarizer may not accurately reflect the themes of individual documents because word weights are determined based upon their occurrence across the document corpus, rather than within each individual document.

SUMMARY OF THE INVENTION

An object of the present invention is to automatically generate document summaries that accurately reflect the themes of each document.

Another object of the present invention is to automatically produce readable and semantically correct document summaries.

Another object of the present invention is to provide a method of automatically generating summaries of documents that requires at most a user specify the length of the desired summary.

Yet another object of the present invention is to automatically generate document summaries without using an iterative approach.

A technique for automatically generating thematic summaries of machine readable documents will be described. The technique begins with determining the number of thematic terms to be used based upon the desired number of thematic sentences to be extracted. To insure some commonality of theme between extracted sentences, the number of thematic terms used should be less than the number of thematic sentences to be extracted. Having determined the appropriate number of thematic terms, next the method identifies the thematic terms within the document. Next, each sentence of the document is scored based upon the number of thematic terms contained within the sentence. Afterward, the desired number of highest scoring sentences are selected as thematic sentences.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
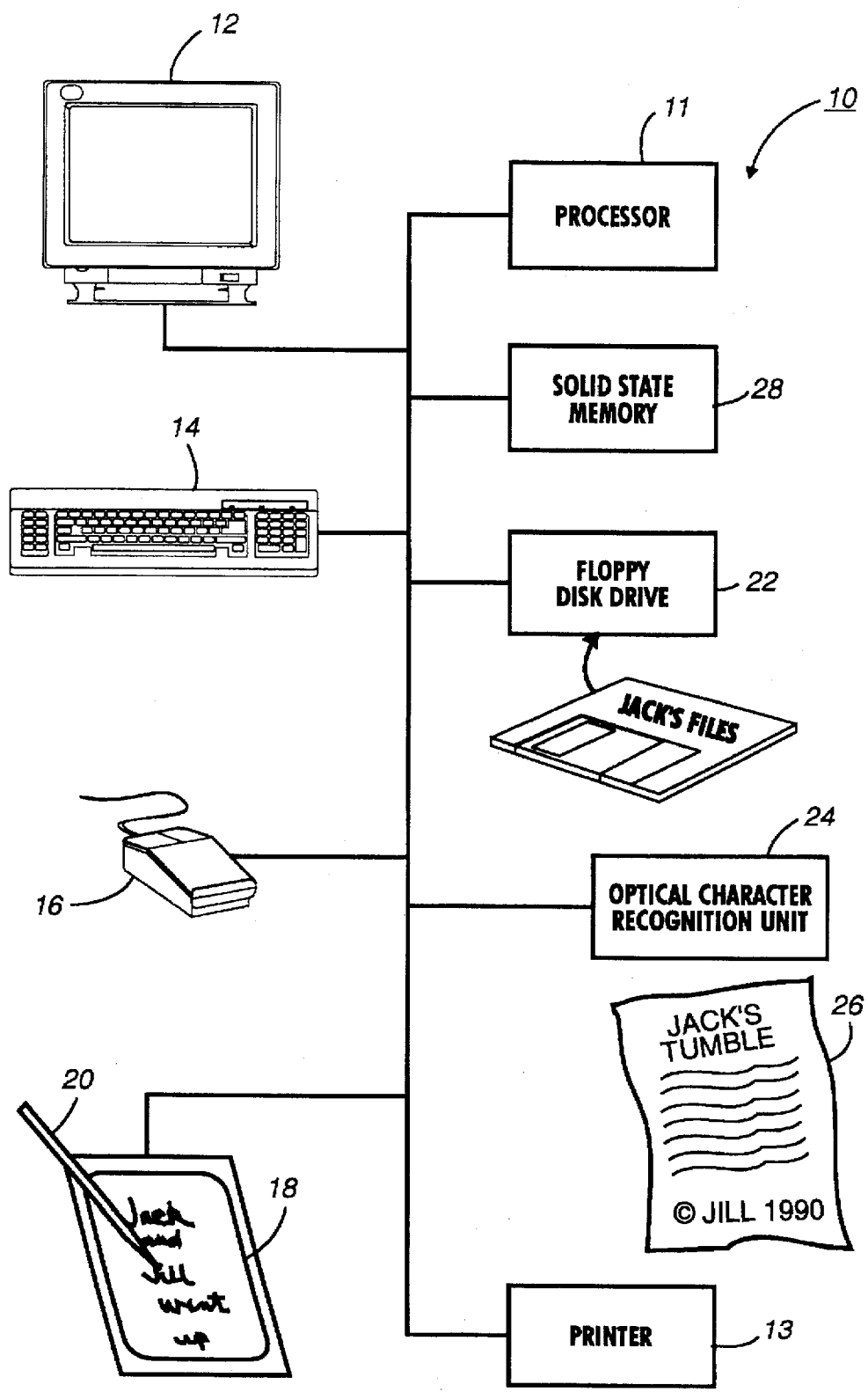
FIG. 1 illustrates a computer system for automatically generating thematic summaries of documents.

FIG. 1 illustrates in block diagram form computer system 10 in which the present method is implemented. The present method alters the operation of computer system 10, allowing it to generate a thematic summary of any document presented in machine readable form. Briefly described, computer system 10 generates a thematic summary by identifying thematic terms within the document and then scoring each sentence of the document based upon the number of thematic terms contained within the sentence. Afterward, computer system 10 selects the highest scoring sentences as thematic sentences and presents those sentences to a user of computer system 10.

Prior to a more detailed discussion of the present method, consider computer system 10. Computer system 10 includes monitor 12 for visually displaying information to a computer user. Computer system 10 also outputs information to the computer user via printer 13. Computer system 10 provides the computer user multiple avenues to input data. Keyboard 14 allows the computer user to input data to computer system 10 by typing. By moving mouse 16 the computer user is able to move a pointer displayed on monitor 12. The computer user may also input information to computer system 10 by writing on electronic tablet 18 with a stylus or pen. Alternately, the computer user can input data stored on a magnetic medium, such as a floppy disk, by inserting the disk into floppy disk drive 22. Optical character recognition unit (OCR unit) 24 permits the computer user to input hardcopy documents into computer system, which OCR unit 24 then converts into a coded electronic representation, typically American National Standard Code for Information Interchange (ASCII).

Processor 11 controls and coordinates the operations of computer system 10 to execute the commands of the computer user. Processor 11 determines and takes the appropriate action in response to each user command by executing instructions stored electronically in memory, either memory 28 or on a floppy disk within disk drive 22. Typically, operating instructions for processor 11 are stored in solid state memory 28, allowing frequent and rapid access to the instructions. Semiconductor memory devices that can be used include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Figure 2:
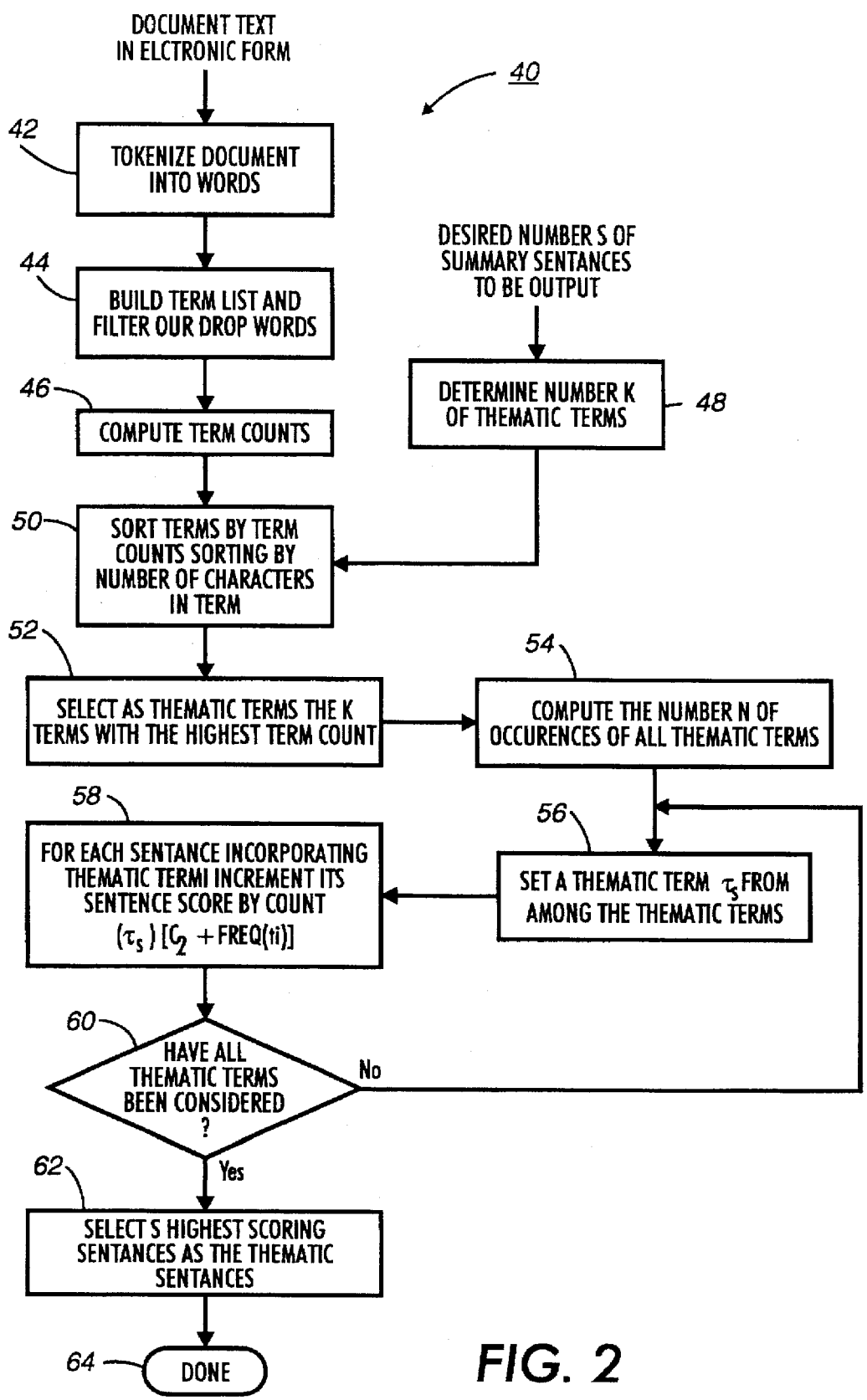
FIG. 2 is a flow diagram of a method of generating a thematic summary of a document using the computer system of FIG. 1.

FIG. 2 illustrates in flow diagram form the instructions 40 executed by processor 11 to generate a thematic summary of a machine readable document. Instructions 40 may be stored in solid state memory 28 or on a floppy disk placed within floppy disk drive 22. Instructions 40 may be realized in any computer language, including LISP and C++.

Initiating execution of instructions 40 requires selection and input of a document in electronic form. If desired, prior to initiating execution of instructions 40 the computer user may also change the length, denoted "S", of the thematic summary from the default length. The default length of the thematic summary may be set to any arbitrary number of sentences. In an embodiment intended for document browsing, the default length of the thematic summary is set to five sentences.

Processor 11 responds to selection of a document to be summarized by branching to step 42. During step 42 processor 11 tokenizes the selected document into words and sentences. That is to say, processor 11 analyzes the machine readable representation of the selected document and identifies sentence boundaries and the words within each sentence. Tokenization of natural language text is well known and therefore will not be described in detail herein. Additionally, during tokenization, processor 11 assigns a sentence I.D. to each sentence of the document. In one embodiment, each sentence is identified by a number representing its location with respect to the start of document. Other methods of identifying the sentences may be used without effecting the present method. After tokenizing the selected document, processor 11 branches from step 42 to step 44.

Processor 11 examines each word token of the document during step 44 and compares the word to the terms already included in a term list. If the word token is not yet included on the list, then processor 11 adds the word to the term list and notes the sentence I.D. of the sentence in which the word occurs. On the other hand, if the word is already on the term list, processor 11 simply adds the sentence I.D. for that word token to the entry, or list, for that term. In other words, during step 44 processor 11 generates a data structure associating words of the document with the location of every occurrence of that term. Thus, for example, a term list entry of "apostasy, 7, 9, 12" indicates that the term "apostasy" occurs in sentences 7, 9, and 12 of the document.

Preferably, while generating the term list, processor 11 filters out stop words. As used herein, "stop words" are words that do not convey thematic meaning and occur very frequently in natural language text. Most pronouns, prepositions, determiners, and "to be" verbs are classified as stop words. Thus, for example, words such as "and, a, the, on, by, about, he, she" are stop words. Stop words within the document are identified by comparing the word tokens for the document to a list of stop words. Eliminating stop words from the term list is not necessary, but doing so reduces the total processing time required to generate a thematic summary of a document.

Processor 11 branches to step 46 from step 44 after completing the term list. During step 46 processor 11 analyzes the term list to determine the number of times each term occurs in the document. This is done simply by counting the number of sentence I.D.s associated with the term. That done, processor 11 branches to step 50.

After initiation of execution and prior to execution of step 50, during step 48, processor 11 determines the number of thematic terms to be used in selecting thematic sentences. That number, denoted "K", is determined based upon the length of the thematic summary; i.e., based upon S. In general, K should be less than S and greater than 1. Requiring K be less than S insures some commonality of theme between selected thematic sentences. Preferably, K is determined according to the equation:

$$K = \begin{cases} S \times c_1 & S \times c_1 > 3 \\ 3 & \text{otherwise;} \end{cases}$$

where:

$c_1$ is a constant whose value is less than 1;

S is the number of sentences in the thematic summary; and

K is the number of thematic terms.

In one embodiment, the value of $c_1$ is set equal to 0.7.

Armed with a value for K and the term counts generated during step 46, processor 11 begins the process of selecting K thematic terms. During step 50, processor 11 sorts the terms of the term list according to their counts; i.e., the total number of occurrences of each term in the document. Ties between two terms having the same count are broken in favor of the term including the greatest number of characters. Having generated a sorted term list and stored the list in memory, processor 11 branches from step 50 to step 52. During step 52 processor selects from the sorted term list the K terms with the highest counts. That done, processor 11 advances to step 54.

During step 54 processor 11 computes the total number of occurrences of the K thematic terms in the document. That number, denoted "N", is calculated by summing the counts of the K thematic terms. Processor 11 branches to step 56 from step 54.

Having selected the thematic terms and determined their counts, processor 11 is ready to begin evaluating the thematic content of the sentences of the document. During steps 56, 58, 60, and 62, processor 11 considers only those sentences that include at least one of the K thematic terms. Processor 11 does so by examining the K highest scoring terms of the sorted term list. After selecting a term, denoted $t_s$, during step 56, processor 11 examines each sentence I.D. associated with $t_s$ during step 58. For each sentence I.D. associated with $t_s$ processor 11 increments that sentence's score. Preferably, the score for each sentence is incremented by s, where s is expressed by the equation:

$$s = countt_s[c_2 + freqt_s];$$

where:

$countt_s$ is the number of occurences of $t_s$ in the sentence $c_2$ is a constant having a non-zero, positive value; and $freqt_s$ is the frequency of the selected term $t_s$.

$freqt_s$ is given by the expression:

$$freqt_s = countt_s/N;$$

where:

N represents the total number of occurrences of thematic terms within the document.

Preferably, $c_2$ is set to a value of one.

Sentence scores can be tracked by generating a sentence score list during step 58. Each time processor 11 selects a sentence I.D. the sentence score list is examined to see if it includes that sentence I.D.. If not, the sentence I.D. is added to the sentence score list and its score is increased as appropriate. On the other hand, if the sentence score list already includes the particular sentence I.D., then the score already associated with the sentence is incremented in the manner discussed previously.

After incrementing the scores of all sentences associated with the selected term, $t_s$, processor 11 branches from step 58 to step 60. During step 60 processor 11 determines whether all the thematic terms have been evaluated. If not, processor 11 returns to step 56 to select another thematic term as the selected term. Processor 11 branches through steps 56, 58, and 60 as described previously until all of the thematic terms have been examined. When that event occurs, processor 11 branches to step 62 from step 60.

During step 62 processor 11 selects as the thematic summary the S sentences with the highest scores. Processor 11 does this by sorting the sentence score list by score. Having selected the thematic sentences, processor 11 may present the thematic summary to the user via monitor 12 or printer 13, as well as storing the thematic summary in memory 22 or to floppy disk for later use. The sentences of the thematic summary are preferably presented in their order of occurrence within the document. While the sentences may be presented in paragraph form, presentation of each sentence individually is preferable because the sentences may not logically form a paragraph. Generation of the thematic summary complete, processor 11 branches to step 64 from step 62.

Thus, a method of automatically generating thematic summaries for documents has been described. The method relies upon quantitative content analysis to identify thematic words, which are used in turn to identify thematic sentences. Appendix A and Appendix B include summaries generated using this method to automatically generate thematic summaries.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

Appendix A: Summary of Shevardnadze's Resignation Speech

I have drawn up the text of such a speech, and I gave it to the secretariat, and the deputies can acquaint themselves with it—what has been done is the sphere of current policy by the country's leadership, by the President and by the ministry of Foreign Affairs, and how the current conditions are shaping up for the development of the country, for the implementation of the plans for our democratization and renewal of the country, for economic development and so on.

Yesterday there were speeches by some comrades—they are our veterans—who raised the question of the need for a declaration to be adopted forbidding the President and the country's leadership from sending troops to the Persian Gulf. And these speeches yesterday, comrades, filled the cup of patience, to overflowing.

On about 10 occasions, both in the country and abroad, I have had to speak and explain the attitude of the Soviet Union toward this conflict.

In that case we would have had to strike through everything that has been done in recent years by all of us, by the whole country and by all of our people in the field of asserting the principles of the new political thinking. Second, I have explained repeatedly, and Mikhail Sergeyevich spoke of this in his speech at the Supreme Soviet, that the Soviet leadership does not have any plans—I do no know, maybe someone else has some plans, some group—but official bodies, the Ministry of Defense—charges are made that the Foreign Minister plans to land troops in the Persian Gulf, in the region.

The third issue, I said there, and I confirm it and state it publicly, that if the interests of the Soviet people are encroached upon, if just one person suffers—wherever it may happen, in any country, not just in Iraq but in any other country—yes, the Soviet Government, the Soviet side will stand up for the interests of its citizens.

I say that, all the same, this is not a random event. Excuse me, I am now going to recall the session of the supreme soviet. On comrade Lukyanov's initiative, literally just before the start of a meeting, a serious matter was included on the agenda about the treaties with the german democratic republic.

I cannot reconcile myself with what is happening in my country and to the trials which await our people.

Appendix B: Summary of "Research that Reinvents the Corporation" by John Seely Brown As companies try to keep pace with rapid changes in technology and cope with increasingly unstable business environments, the research department has to do more than simply innovate new products.

Over the next decade, PARC researchers were responsible for some of the basic innovations of the personal-computer revolution—only to see other companies commercialize these innovations more quickly than Xerox.

One popular answer to these questions is to shift the focus of the research department away from radical breakthroughs toward incremental innovation, away from basic research toward applied research.

Our emphasis on pioneering research led us to redefine what we mean by technology, by innovation, and indeed by research itself.

Such activities are essential for companies to exploit successfully the next great breakthrough in information technology: "ubiquitous computing," or the incorporation of information technology in a broad range of everyday objects.

When corporate research begins to focus on a company's practice as well as its products, another principle quickly becomes clear: innovation isn't the privileged activity of the research department. At PARC, we are studying this process of local innovation with employees on the front lines of Xerox's business and developing technologies to harvest its lessons for the company as a whole.

The result: important contributions to Xerox's core products but also a distinctive approach to innovations with implications far beyond our company.

What is claimed is:

1. A processor implemented method of generating a thematic summary of a document presented in machine readable form to the processor, the document including a first multiplicity of sentences and a second multiplicity of terms, the processor implementing the method by executing instructions stored in electronic form in a memory device coupled to the processor, the processor implemented method comprising the steps of:

a) determining a value of a first number of thematic terms based upon a value of a second number representing a length of the thematic summary, the first number being less than the second number;

b) selecting the first number of thematic terms from the second multiplicity of terms;

c) scoring each sentence of the first multiplicity of sentences based upon occurrence of thematic terms in each sentence; and d) selecting the second number of thematic sentences from the first multiplicity of sentences based upon the score of each sentence.

2. The processor implemented method of claim 1 further comprising the step of:

e) presenting the thematic sentences to user of the processor in an order in which the thematic sentences occur in the document.

3. The processor implemented method of claim 1 wherein step c) comprises incrementing the score of each sentence for each thematic term occurring in the sentence by an amount related to the frequency of occurrence of the thematic term within the document.

4. The processor implemented method of claim 1 prior to step a) further comprising the steps of:

e) receiving the value of the second number from an input device coupled to the processor.

5. The processor implemented method of claim 4 wherein the first number is at least three.

6. A processor implemented method of generating a thematic summary of a document presented in machine readable form to the processor, the document including a first multiplicity of sentences and a second multiplicity of terms, the processor implementing the method by executing instructions stored electronically in a memory device coupled to the processor, the processor implemented method comprising the steps of:

a) determining a value of a first number of thematic terms based upon a value of a second number representing a length of the thematic summary, the first number being less than the second number;

b) determining a number of times each term of the second multiplicity of terms occurs in the document, c) selecting the first number of thematic terms from the second multiplicity of terms based upon the number of times each term occurs in the document;

d) scoring each sentence of the first multiplicity of sentences based upon occurrences of thematic terms within each sentence; and e) selecting the second number of thematic sentences from the first multiplicity of sentences based upon the sentence scores.

7. The processor implemented method of claim 6 further comprising the step of:

f) presenting the thematic summary to a user of the processor by presenting the thematic sentences in an order in which they occur in the document.

8. The computer implemented method of claim 7 wherein step d) comprises incrementing the score of each sentence for each thematic term occurring in the sentence by an amount related to the frequency of occurrence of the thematic term within the document.

9. The processor implemented method of claim 8 prior to step a) further comprising the steps of:

e) receiving the value of the second number from an input device coupled to the processor.

10. The processor implemented method of claim 9 wherein the first number is at least three.

* * * * *